United States Patent
Nakao et al.

(10) Patent No.: US 7,486,479 B2
(45) Date of Patent: Feb. 3, 2009

(54) MAGNETIC HEAD ASSEMBLY WITH AT LEAST ONE GUIDE BLOCK SET BACK FROM SLIDING SURFACE OF SERVO SIGNAL RECORDING HEAD

(75) Inventors: Toru Nakao, Kanagawa (JP); Takahisa Izumida, Kanagawa (JP); Akihiro Hashimoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 443 days.

(21) Appl. No.: 10/826,505

(22) Filed: Apr. 19, 2004

(65) Prior Publication Data

US 2004/0228034 A1 Nov. 18, 2004

(30) Foreign Application Priority Data

May 15, 2003 (JP) ............................. 2003-136706

(51) Int. Cl.
*G11B 15/60* (2006.01)
*G11B 5/187* (2006.01)

(52) U.S. Cl. .................................. 360/130.21; 360/122
(58) Field of Classification Search ............ 360/130.21, 360/129, 122
See application file for complete search history.

(56) References Cited

U.S. PATENT DOCUMENTS

| | | | | |
|---|---|---|---|---|
| 4,044,392 A * | 8/1977 | Brock et al. | ................ | 360/316 |
| 5,237,476 A * | 8/1993 | Bischoff et al. | .............. | 360/126 |
| 5,307,227 A * | 4/1994 | Okada et al. | ................. | 360/122 |
| 5,574,606 A * | 11/1996 | Kimura | .................. | 360/130.21 |
| 5,883,770 A * | 3/1999 | Biskeborn et al. | ...... | 360/130.21 |
| 5,905,613 A * | 5/1999 | Biskeborn et al. | ...... | 360/130.21 |
| 5,933,301 A * | 8/1999 | Shimizu et al. | ......... | 360/130.21 |
| 6,137,659 A * | 10/2000 | Warmenhoven | .......... | 360/261.1 |
| 6,433,959 B1 | 8/2002 | Lakshmikumaran et al. | | |
| 2002/0167758 A1* | 11/2002 | Kennedy et al. | ............ | 360/125 |

FOREIGN PATENT DOCUMENTS

JP  2001-035048 A  2/2001

* cited by examiner

*Primary Examiner*—Craig A Renner
(74) *Attorney, Agent, or Firm*—Sughrue Mion, PLLC

(57) ABSTRACT

A magnetic head assembly to record servo signals, that serves for positioning of data recording magnetic heads and data reproducing magnetic heads, on magnetic tapes includes a servo signal recording head of which sliding surface has a magnetic gap embedded thereon in order to record the servo signals onto a magnetic tape and guide blocks which are set adjacent to at least one of the up-stream position or the down-stream position of a line of magnetic tape passing the servo signal recording head and are slightly set back from the sliding surface of the recording head so that said magnetic tape slides an edge of the servo signal recording head and an edge of the guide block.

24 Claims, 3 Drawing Sheets

Cut View in III-III Line

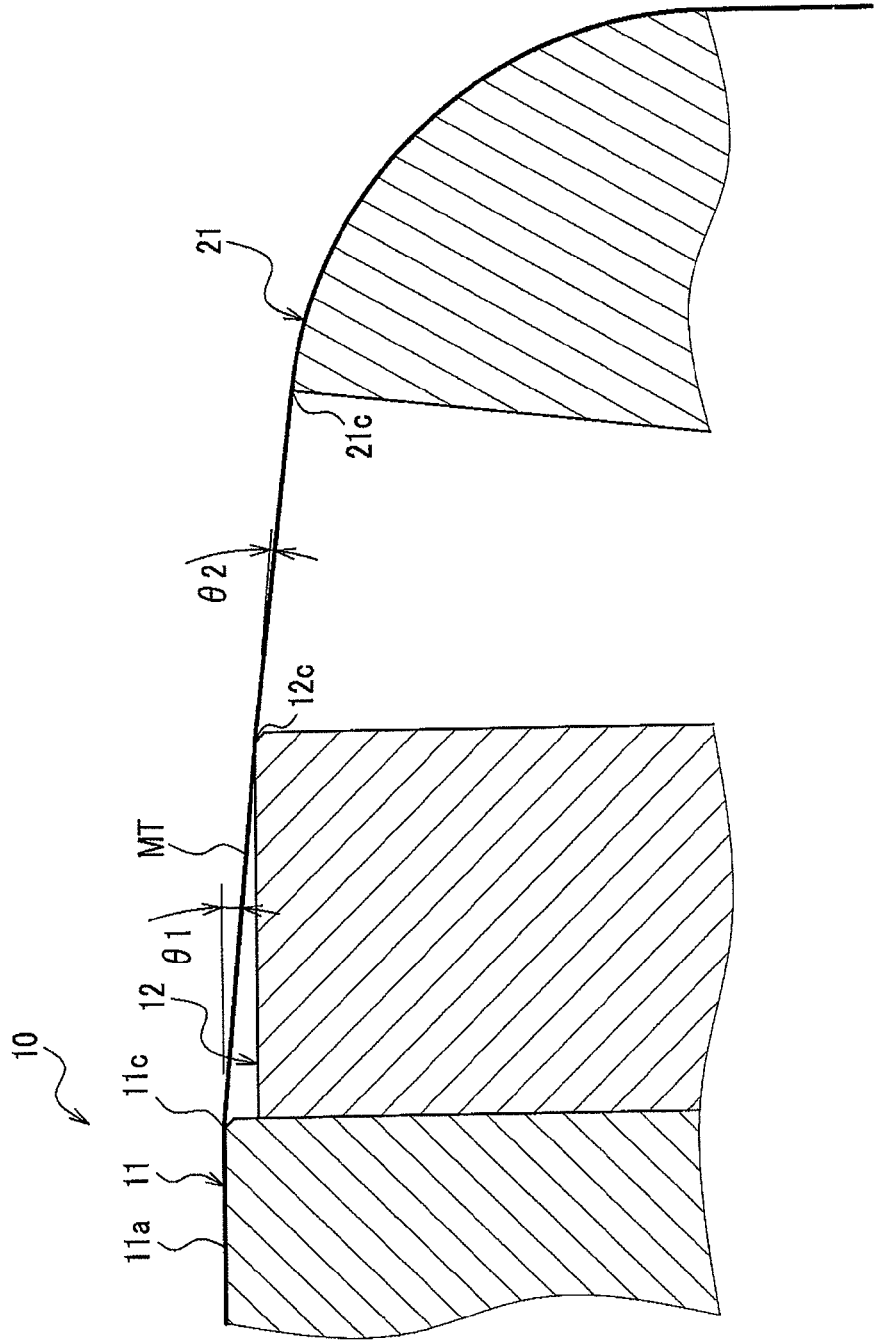

MAGNETIC HEAD ASSEMBLY WITH AT LEAST ONE GUIDE BLOCK SET BACK FROM SLIDING SURFACE OF SERVO SIGNAL RECORDING HEAD

FIELD OF THE INVENTION

The present invention relates to a magnetic head assembly and the magnetic tape servo signal writer (abbreviated as "servo writer" hereinafter) to which the magnetic head assembly is applied.

BACKGROUND OF THE INVENITON

For stamping the servo signals onto the magnetic tapes by using a servo writer, the servo signals are recorded while the magnetic tapes are passing through the magnetic head installed in the servo writer. Since the recorded servo signals are used for the reference tracks to which the operation of the magnetic recording heads or the magnetic reproducing heads are adjusted. Therefore it is quite important to precisely record the servo signals in the position relative to the side edges of the magnetic tapes.

A prior art in a published patent show an example of the servo signal recording technology as shown in the reference 1. This existing technology is to use a combination of a tape guide and a bias mechanism of air pressure so that the tape is slightly floated and guided in compliance to the tape guide. This mechanical construction of the guiding system suppresses the tape lateral vibration against the tape passing to the tape take-up reels.

Reference 1
Published Japanese Patent Application: paragraphs 0008-0021 and FIG. 1, JP, 2001-35048, A (1999)
Reference 2
U.S. Pat. No. 6,433,959 B1

However, in this existing technology, it is necessary to control the air pressure for the bias mechanism. The constant air pressure does not guarantee at the stable tape passing on the tape bias mechanism due to the compressiveness and the dynamic vibration of the air flow and the elasticity of the magnetic tape material.

For the case of the poor alignment of the tape passing direction against the guiding mechanism, an edge of the tape is pushed against the tape guide and damaged by the rubbing with the guide, that is, so-called "edge damage".

The present invention has an advantage to suppress the lateral vibration for the tapes passing through the servo signal recording head to be wound to the tape reels. It is preferred to suppress the lateral vibration potentially generated in the servo writer. Then the passing tapes have no edge damages and stable tracks of recorded servo signals are obtained in the magnetic tapes. In addition, the present invention provides a servo writer that records stable servo signals by the magnetic head assembly.

BRIEF SUMMARY OF INVENTION

The magnetic head assembly comprises guide blocks and a servo signal recording head such as a servo write head. The signal recoding head has a recording surface, which is a sliding surface on which a magnetic gap for recording embedded and the passing tape is sliding with contact so that the servo signals are recorded onto the tape. A guide block is attached to either the up-stream position of the passing tape or the down-stream position of the passing tape or two guide blocks attached to both of them. This or these guide blocks are slightly set back to the surface of the servo write head on which the magnetic tape is sliding. Therefore the magnetic tape is held by these edges as edges of the recording head.

In this configuration of the guide blocks adjacent to the servo write head, the passing tape is pushed to contact onto two edges of the servo write head. These two edges make a rectangular shape frame of the passing tape. One of the edges of the servo write head and the opposite edge of the guide block to the servo write head make another rectangular frame of the passing tape. The passing tape is kept in a tension along the sliding direction therefore the tape has rigidity in the right angle to the tension force. Especially, the effect of the rigidity provided in such rectangular frame shape turns into a flexural rigidity against the lateral force against the tape passing direction as given by E×I. E is a Young's modulus and I is the secondary section moment which is given by $b \times h^3/12$ where b is the thickness of the tape and h the width of the magnetic tape. According to the cubic relation to the tape width, the rigidity against the lateral force can be extremely large even for the thin tape base and small Yong's modulus of the tape base. The edges work to hold a beam shape in three dimensional view (as well as the rectangular shape in planer dimensional view) so that such flexible magnetic tapes has strong rigidity against the lateral force or lateral vibration against the tape passing direction in cooperation with the tension that stretches the magnetic tape to maintain the beam shape. The tension to stretch the magnetic tape works to prevent buckling due to the lateral force onto the magnetic tape as well. The tension is generated by the winding force of the tape reel.

For the case when the servo signal head is equipped with two guide blocks, then another flexural rigidity is added to the flexural rigidity generated by an edge of a guide block and an edge of the servo signal head. Therefore the configuration with two guide blocks serves to further stabilize the passing tape.

The wrap angle θ1, that is an angle of attack of the tape against the sliding surface of the servo write head, is preferred to be 1.0 to 6.0 degrees. Because the angle in this range allows the tape sliding on the surface of the servo signal recoding head without damages such as scratching or exfoliation of the recording layer of the tape.

In the present invention, hardness of the guide block is preferred to be more than 1200 Vickers especially at the edge portion which contacts with the passing tape. For this hardness, the abrasion of the edge portion can be prevented.

A metal alloy as $Al_2O_3.TiC$ (Aluminum Titanium Carbide) or surface-finishing for hardening is preferred to be used for the guide block since the use of such a metal alloy can prevent abrasion of the guide block.

In the present invention, it is preferred that the wrap angle θ1, that is an angle of attack of the tape against the surface of the passing tape sliding through the guide block, is preferred to be 0.5 to 2.0 degrees. In this alignment of the guide block, it is possible that the magnetic tapes can run on the servo write head with appropriate contact without the damages added onto the tape.

BRIEF DESCRIPTION OF THE DRAWINGS

FIG. 3 is a cut view of the magnetic head assembly along the cut line III-III shown in FIG. 2.

DETAILED DISCRIPTION OF THE INVENTION

Figure 1:
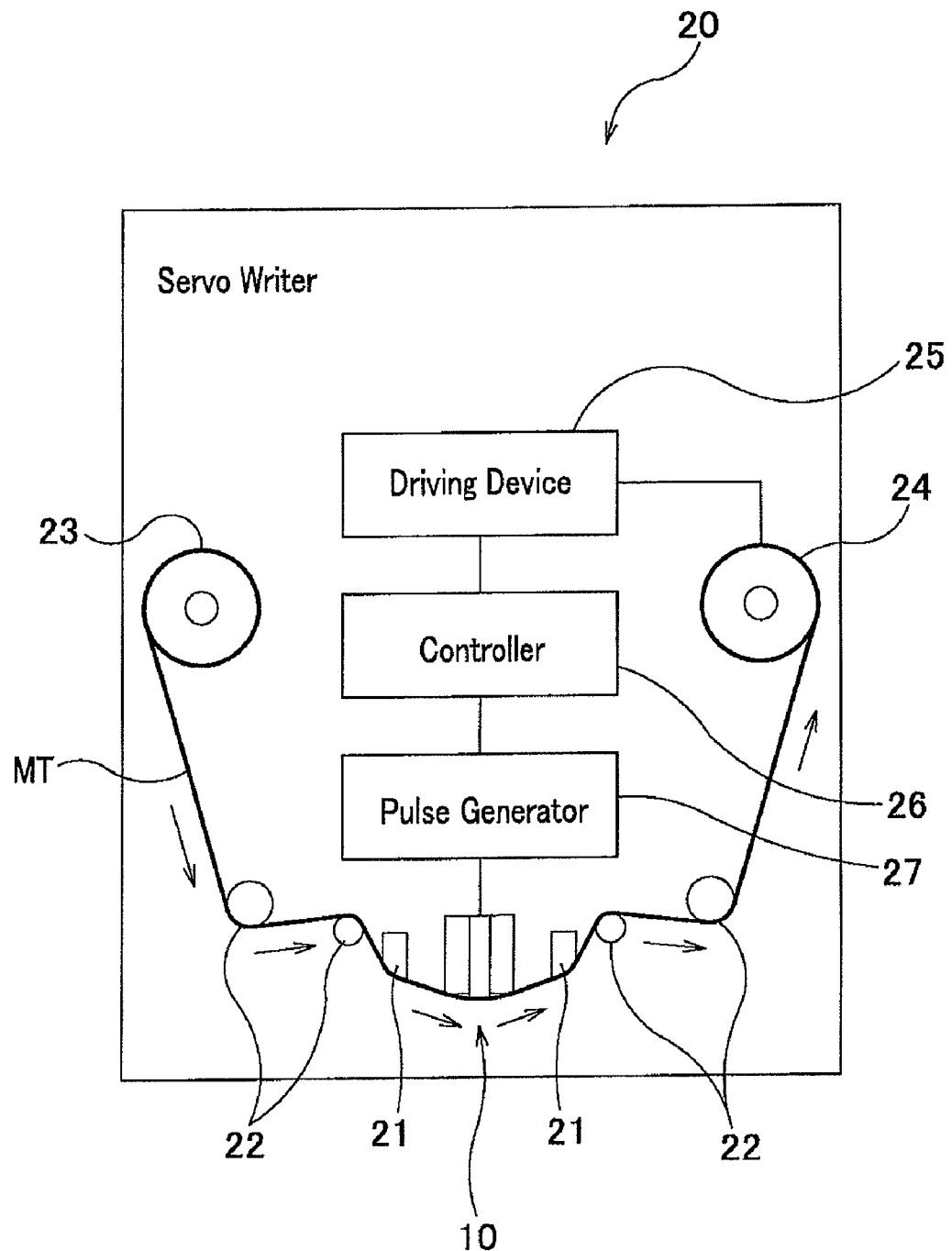
FIG. 1 is a block diagram that shows the conceptual construction of a servo writer regarding the embodiment of the present invention.

By referring to the drawings, we will explain the embodiments of the magnetic head assembly and servo writer regarding the present invention.

Figure 2:
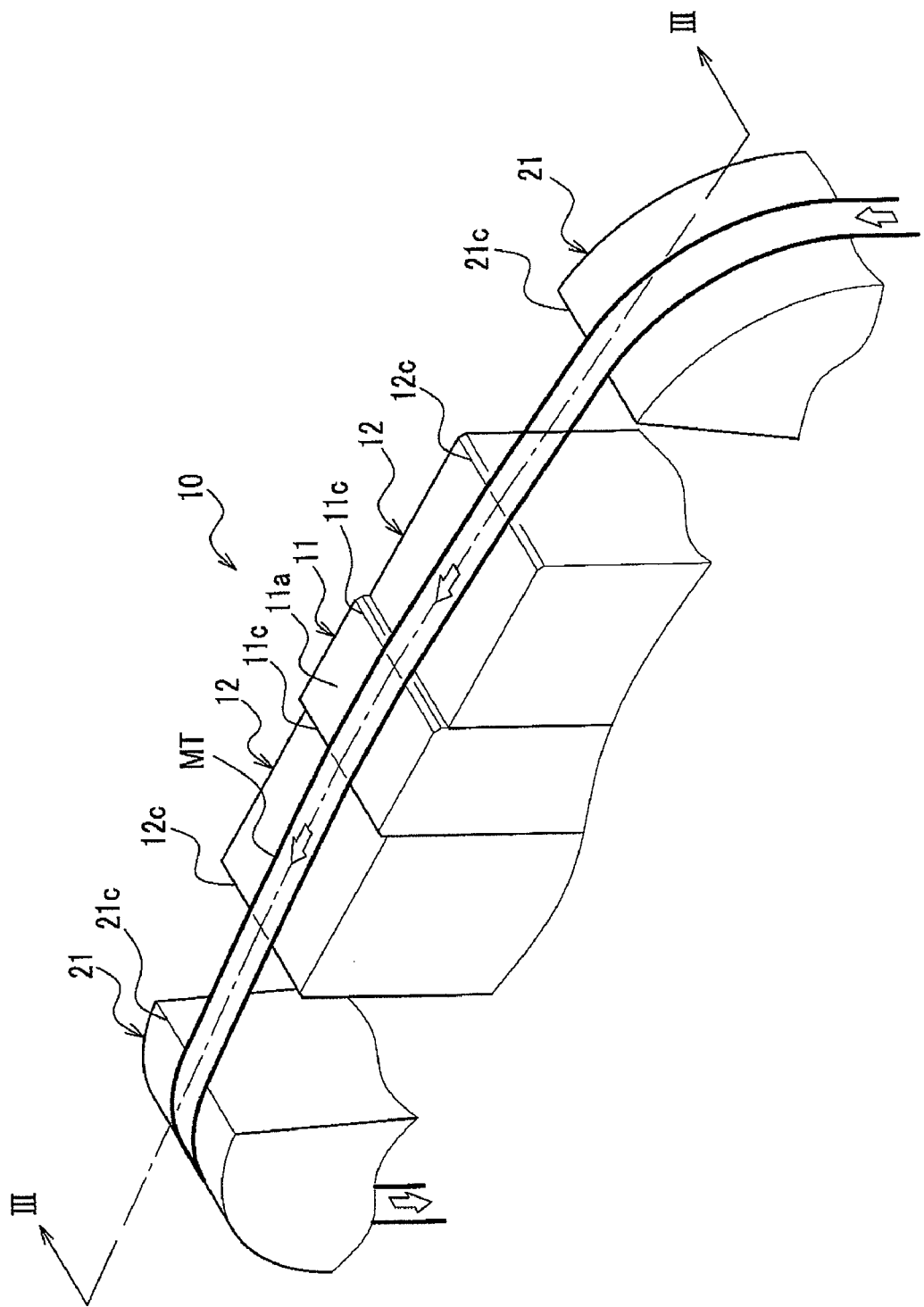
FIG. 2 is a perspective schematic that shows a magnetic head assembly regarding the embodiment of the present invention.

The FIG. 1 shows an overall conceptual construction of the servo writer in the present embodiment. FIG. 2 shows a perspective view of the magnetic head assembly and FIG. 3 shows the cross sectional view of the magnetic head assembly cut in the line III-III.

The servo writer 20 is mainly constructed with tape guides 21, guide rollers 22, supply reel 23 and take-up reel 24, driving device 25, a controller 26, a pulse generator 27 and a magnetic head assembly 10.

The magnetic tape which is not pre-stamped with the servo signals is wound in the supply reel 23. The magnetic tape MT passing out from the supply reel 23 is guided to the magnetic head assembly 10 through the guide roller 22 and tape guide 21. The magnetic tape MT is wound by take-up reel 24 through another set of the tape guide 21 and the guide roller 22. The take-up reel 24 is driven by the driving device 25 and winds up the magnetic tape to which the servo signals have already been recorded by the magnetic head assembly 10. The controller 26 controls the operation of every portion of the servo writer 20. The pulse generator 27 supplies the current pulse for servo signal recording to the magnetic head assembly 10. The controller 26 controls the generation of the current pulses for the servo signal recording.

As shown in FIG. 2, the magnetic head assembly 10 comprises a servo write head 11 on which a magnetic gap for recording is formed and guide blocks which are adjacently set to the servo write head 11 so that one guide block locates in the up-stream position and the other in the down-stream position along the passing tape thereon.

The servo write head 11 has a magnetic gap on the recording surface in order to generate magnetic flux leakage for recording the servo signal onto the magnetic tape. The magnetic flux is driven by a coil wound around the recording head and the magnetic gap made on the servo write head 11, on which surface the magnetic tape is sliding, has a topological pattern to record an appropriate tracking pattern of the servo signal in the recording layer of the magnetic tape. The sliding surface 11a on the servo write head 11 has two edges 11c at the ends of head. The magnetic gap is formed on the position on the sliding surface 11a so that the tracking patterns along which the servo signals are recorded are made on particular position on the magnetic tapes. The semiconductor photo lithography technology is applied to make such magnetic gap for the purpose of precision and the massive productivity.

Two guide blocks are formed in rectangular solids and aligned adjacently to the servo write head 11. The surfaces of the guide blocks facing to the magnetic tape are set slight back against the sliding surface 11a. Therefore the magnetic tape MT is guided in sliding on the edges 12c. The magnetic tape MT is slightly bent at these edges 11c.

The edges 11c and 12c squeeze the air layer on the surface of the magnetic tape MT before the magnetic tape is passing through on the servo write head 11. Therefore the air layer on the surface of the magnetic tape MT can hardly push back the pressure of atmospheric air which is loaded onto the tape base and the gap between the sliding surface of the servo signal recoding head and recording layer of the magnetic tape MT may be minimized and surely and stable recording of the servo signal is realized because sufficient proximity for the magnetic leakage at the magnetic gap is obtained. A slight chamfering for the edges may be preferable to prevent the scratches made on the recording layer of the magnetic tape in passing thereon in contact with the edges.

Metals or ceramics are preferred to be used for the materials of the guide blocks. If the metals are used, the surface of the guiding block should be finished for hardening. For example, titanium nitride (TiN) or diamond like carbon (DLC) may be coated on the surface. As for ceramic materials, aluminum titanium carbide ($Al_2O_3.TiC$) may be used for the guide blocks. The hardness of the edges 12c should be more than 1200 Vickers hardness at least and preferably more than 2000 Vickers hardness.

The wrap angle $\theta 1$ of the magnetic tape MT against the sliding surface 11a is selected to be 1.0 to 6.0 degrees. For example, the embodiment shown in FIG. 3 has 4.0 degrees of the wrap angle $\theta 1$.

The wrap angle $\theta 1$ is determined by the edges 11c of the servo write head 11 and the edge 12c of the guide block. The wrap angle $\theta 1$ is, as shown in FIG. 3, defined as a bending angle of the passing tape at the edges.

The edges 12c of the guide block 12 and the edges 21c of the tape guide 21 make another wrap angle $\theta 2$ for the tape MT passing through the magnetic head assembly 10. The wrap angle $\theta 2$ is preferably selected to be 0.5 to 2.0 degrees. For example, the embodiment shown in FIG. 3 has 1.0 degree of the wrap angle $\theta 2$.

Two tape guides are set; one at the position of the up-stream of the line of tape passing and the other the down-stream of the line of tape passing. These tape guides 21 have air floating system so that the magnetic tape does not directly contact with the guiding surfaces of the tape guides 21 but via thin air layer. The tape guides 21 have a smooth curvature in the passing through of the magnetic tapes and guides to stably settle the passing tape therein particularly not to laterally vibrate.

The operation and resultant effects for the use of the servo writer 20 and the magnetic head assembly 10 are explained as follows.

To begin with, a magnetic tape MT is set in a supply reel 23 before recording the servo signal. The magnetic tape is set on the guide rollers 22, the tape guides 21 and the magnetic head assembly 10. The end portion of the magnetic tape is linked to the take-up reel 24. The take-up reel and the supply reel 23 are driven by the driving device 25.

The controller 26 controls the pulse generator 27 that generates current signals supplied to the magnetic head assembly 10 in order to record the servo signals onto the magnetic tapes.

The magnetic head assembly 10 generates the magnetic flux leaked from the magnetic gap and the servo signals are recorded.

The magnetic tape MT sliding on the magnetic head assembly 10 is passing in contact with the edges 12c of the guide blocks 21 and the edges 11c of the servo write head 11. The beam shape of the passing tape formed by these edges and the tension of the magnetic tape stretched by the take-up reel provide high rigidity in the lateral direction and suppress the lateral vibration, especially the short cyclic vibration due to the large rigidity of the magnetic tape.

The foreign particles such as powder of the magnetic material may attach to the recording layer of the magnetic tape MT due to the electrostatic effect. However these foreign particles are removed by the edges 11c and 12c when the magnetic tape passes therethrough. Therefore a good contact is kept between the magnetic tape MT and the sliding surface 11a. By this removing effect, the magnetic gap for the recording head is kept clean and good reliability of servo signal recording is obtained.

Although there have been disclosed what are the patent embodiment of the invention, it will be understood by person skilled in the art that variations and modifications may be made thereto without departing from the scope of the invention, which is indicated by the appended claims. For example, a single guide block, not two of the blocks, is only used at the up-stream position or at the down-stream position of the servo write head 11.

The configuration of the servo write head and the guide blocks can prevent the lateral vibration of the passing magnetic tape in recording the servo signals thereon. Therefore the servo signal is stamped in the magnetic tape with a constant tracking from the reference marginal edge of the magnetic tapes.

Foreign particles may attach to the magnetic tape passing through the magnetic head assembly 10. However the edges scrape off the particles so that they are not carried into the recording gap for the servo signal recording. Therefore the stable and reliable servo signal recording can be done.

What is claimed is:

1. A magnetic head assembly to record servo signals, that serves for positioning of data recording magnetic heads and data reproducing magnetic heads, on a magnetic tape comprising:
   a servo signal recording head wherein a sliding surface of said servo signal recording head has a magnetic gap embedded thereon in order to record said servo signals onto the magnetic tape, and
   a guide block which is set adjacent to a position of up-stream of a line of said magnetic tape passing said servo signal recording head and is slightly set back from said sliding surface of said servo signal recording head so that said magnetic tape slides on an edge of said servo signal recording head and on an outer edge of said guide block, the edge of said servo signal recording head and the outer edge of said guide block being chamfered,
   wherein a wrap angle ($\theta 1$) between said sliding surface of said recording head and a plane formed by the edge of said servo signal recording head and said outer edge of said guide block is in a range of 1.0 to 6.0 degrees.

2. A magnetic head assembly according to claim 1,
   wherein said guide block has at least at a portion of said outer edge made of a material which has hardness of more than 1200 Vickers hardness.

3. A magnetic head assembly according to claim 1, wherein said guide block is made of a material of $Al_2O_3.TiC$.

4. A magnetic head assembly according to claim 1, wherein said guide block is surface-finished for hardening.

5. A magnetic tape servo writer having a magnetic head assembly according to claim 1,
   wherein another wrap angle ($\theta 2$) between a plane formed by the edge of said servo signal recording head and said outer edge of said guide block and a plane formed by the outer edge of said guide block and an edge of a tape guide which is adjacent to said guide block along a passing line of said magnetic tape is 0.5 to 2.0 degrees.

6. A magnetic head assembly according to claim 1, wherein the magnetic tape comes into contact with only the outer edge of the guide block.

7. A magnetic head assembly according to claim 1, wherein the magnetic tape slides on the sliding surface of the servo signal recording head.

8. A magnetic head assembly according to claim 1, wherein the magnetic tape is not parallel to an uppermost surface of the guide block.

9. A magnetic head assembly according to claim 1, wherein the recording head includes a planar surface as the sliding surface and wherein the guide block is displaced from the planar surface, the guide block having a guide block planar surface substantially parallel to the planar sliding surface.

10. A magnetic head assembly according to claim 1, wherein the guide block is comprised of an inner wall, which is closest to the servo signal recording head, and an outer wall, which is farthest away from the servo signal recording head, wherein the outer edge is formed on the outer wall.

11. A magnetic head assembly according to claim 10, wherein the inner wall directly abuts the servo signal recording head.

12. A magnetic head assembly to record servo signals, that serves for positioning of data recording magnetic heads and data reproducing magnetic heads, on a magnetic tape comprising:
    a servo signal recording head wherein a sliding surface of said servo signal recording head has a magnetic gap embedded thereon in order to record said servo signals onto the magnetic tape, and
    a guide block which is set adjacent to a position of down-stream of a line of said magnetic tape passing said servo signal recording head and is slightly set back from said sliding surface of said servo signal recording head so that said magnetic tape slides on an edge of said servo signal recording head and on an outer edge of said guide block, the edge of said servo signal recording head and the outer edge of said guide block being chamfered,
    wherein a wrap angle ($\theta 1$) between said sliding surface of said recording head and a plane formed by the edge of said servo signal recording head and said outer edge of said guide block is in a range of 1.0 to 6.0 degrees.

13. A magnetic head assembly according to claim 12,
    wherein said guide block has at least at a portion of said outer edge made of a material which has hardness of more than 1200 Vickers hardness.

14. A magnetic head assembly according to claim 12, wherein said guide block is made of a material of $Al_2O_3.TiC$.

15. A magnetic head assembly according to claim 12, wherein said guide block is surface-finished for hardening.

16. A magnetic tape servo writer having a magnetic head assembly according to claim 12,
    wherein another wrap angle ($\theta 2$) between a plane formed by the edge of said servo signal recording head and said outer edge of said guide block and a plane formed by the outer edge of said guide block and an edge of a tape guide which is adjacent to said guide block along a passing line of said magnetic tape is 0.5 to 2.0 degrees.

17. A magnetic head assembly to record servo signals, that serves for positioning of data recording magnetic heads and data reproducing magnetic heads, on a magnetic tape comprising:
    a servo signal recording head wherein a sliding surface of said servo signal recording head has a magnetic gap embedded thereon in order to record said servo signals onto the magnetic tape, and
    two guide blocks of which one guide block is set adjacent to a position of up-stream of a line of said magnetic tape passing said servo signal recording head, the other guide block is set adjacent to a position of down-stream of a line of said magnetic tape passing said servo signal recording head and both guide blocks are slightly set back from said sliding surface of said servo signal recording head so that said magnetic tape slides on a downstream edge and an upstream edge of said servo signal recording head and on an outer edge of each said guide block, wherein the downstream edge and the upstream edge of said servo signal recording head and the outer edge of each said guide block are chamfered, wherein a wrap angle ($\theta_1$) between said sliding surface of said recording head and a plane formed by at least one of the downstream edge and the upstream edge of said servo signal recording head and said outer edge of at least one of said guide blocks is in a range of 1.0 to 6.0 degrees.

18. A magnetic head assembly according to claim 17, wherein each said guide block has at least at a portion of said outer edge made of a material which has hardness of more than 1200 Vickers hardness.

19. A magnetic head assembly according to claim 17, wherein each said guide block is made of a material of $Al_2O_3.TiC$.

20. A magnetic head assembly according to claim 17, wherein each said guide block is surface-finished for hardening.

21. A magnetic tape servo writer having a magnetic head assembly according to claim 17, wherein another wrap angle ($\theta_2$) between a plane formed by at least one of the downstream edge and the upstream edge of said servo signal recording head and said outer edge of at least one of said guide blocks and a plane formed by the outer edge of said at least one of said guide blocks and an edge of a tape guide which is adjacent to said at least one of said guide blocks along a passing line of said magnetic tape is 0.5 to 2.0 degrees.

22. A servo signal writer, comprising:

a magnetic tape;

a magnetic tape driving assembly, a controller which controls the tape driving assembly, and a magnetic head assembly to record servo signals, that serves for positioning of data recording magnetic heads and data reproducing magnetic heads, on the magnetic tape, the magnetic head assembly comprising:

a servo signal recording head wherein a sliding surface of said servo signal recording head has a magnetic gap embedded thereon in order to record said servo signals onto the magnetic tape, and a guide block which is set adjacent to a position of upstream of a line of said magnetic tape passing said servo signal recording head and is slightly set back from said sliding surface of said servo signal recording head so that said magnetic tape slides on an edge of said servo signal recording head and on an outer edge of said guide block, wherein the magnetic tape comes into contact with only the outer edge of the guide block;

wherein the recording head includes a planar surface as the sliding surface and wherein an uppermost surface of the guide block is substantially parallel to the planar sliding surface.

23. The servo signal writer according to claim 22, wherein the magnetic tape slides on the sliding surface of the servo signal recording head.

24. The servo signal writer according to claim 22, wherein the magnetic tape is not parallel to the uppermost surface of the guide block.

\* \* \* \* \*